US011265298B2

(12) United States Patent
Binsztok

(10) Patent No.: US 11,265,298 B2
(45) Date of Patent: Mar. 1, 2022

(54) METHOD FOR END-TO-END TRANSMISSION OF A PIECE OF ENCRYPTED DIGITAL INFORMATION, APPLICATION OF THIS METHOD AND OBJECT IMPLEMENTING THIS METHOD

(71) Applicant: WALLIX, Saint-Honoré (FR)

(72) Inventor: Henri Binsztok, Paris (FR)

(73) Assignee: Wallix, Saint-Honore (FR)

( * ) Notice: Subject to any disclaimer, the term of this patent is extended or adjusted under 35 U.S.C. 154(b) by 248 days.

(21) Appl. No.: 16/476,823

(22) PCT Filed: Dec. 29, 2017

(86) PCT No.: PCT/FR2017/053867
§ 371 (c)(1),
(2) Date: Jul. 9, 2019

(87) PCT Pub. No.: WO2018/130761
PCT Pub. Date: Jul. 19, 2018

(65) Prior Publication Data
US 2019/0364025 A1    Nov. 28, 2019

(30) Foreign Application Priority Data

Jan. 10, 2017   (FR) ...................................... 1750212

(51) Int. Cl.
*H04L 29/06* (2006.01)
*H04L 9/00* (2022.01)
(Continued)

(52) U.S. Cl.
CPC .......... *H04L 63/0442* (2013.01); *H04L 9/006* (2013.01); *H04L 9/0822* (2013.01);
(Continued)

(58) Field of Classification Search
CPC . H04L 63/0428; H04L 63/0442; H04L 9/006; H04L 9/0822; H04L 9/0827; H04L 51/10; H04W 12/041; H04W 12/033
See application file for complete search history.

(56) References Cited

U.S. PATENT DOCUMENTS 7,177,426 B1 * 2/2007 Dube .................. G06F 21/6209
380/262
7,240,366 B2   7/2007 Buch et al.
(Continued)

FOREIGN PATENT DOCUMENTS

AU       2013205071 A1    5/2013
DE   102015119687 A1 *   5/2017  ............... H04L 9/30
(Continued)

OTHER PUBLICATIONS

International Written Opinion for International Application No. PCT/FR2017/053867 dated Feb. 28, 2018, 7 pages.
(Continued)

*Primary Examiner* — Kristine L Kincaid
*Assistant Examiner* — Alexander R Lapian
(74) *Attorney, Agent, or Firm* — TraskBritt

(57) ABSTRACT

A method for end-to-end transmission of a piece of encrypted digital information includes the following steps: selection, on the computer equipment of the transmitter, of a piece of digital information and a digital identifier of the recipient; temporary encryption of the piece of digital information by execution of a local encryption application on the computer equipment with the private key of the sender; decryption of the piece of information on the equipment of the sender and encryption of the piece of information with the public key of the recipient; transmission to the recipient, by the computer equipment, from the sender, of the piece of digital information encrypted with the public key of the sender, optionally by the intermediary of the transactional (Continued)

platform; and decryption by the computer equipment of the recipient of the piece of information with the public key of the sender.

18 Claims, 4 Drawing Sheets

(51) Int. Cl.
    *H04L 9/08*     (2006.01)
    *H04L 51/10*     (2022.01)
    *H04W 12/033*     (2021.01)
    *H04W 12/041*     (2021.01)

(52) U.S. Cl.
    CPC ............ *H04L 9/0827* (2013.01); *H04L 51/10* (2013.01); *H04L 63/0428* (2013.01); *H04W 12/033* (2021.01); *H04W 12/041* (2021.01)

(56) References Cited

U.S. PATENT DOCUMENTS

| | | | | |
|---|---|---|---|---|
| 10,601,863 | B1* | 3/2020 | Siddiqui | H04L 63/0876 |
| 2002/0129238 | A1* | 9/2002 | Toh | H04L 63/061 |
| | | | | 713/153 |
| 2007/0130464 | A1* | 6/2007 | Swedor | H04L 9/3263 |
| | | | | 713/170 |
| 2010/0189260 | A1 | 7/2010 | Ramanathan et al. | |
| 2014/0039911 | A1* | 2/2014 | Iyer | G06Q 30/0629 |
| | | | | 705/2 |
| 2015/0149775 | A1* | 5/2015 | Gadotti | H04L 63/0428 |
| | | | | 713/168 |
| 2016/0191470 | A1* | 6/2016 | Movalia | H04L 9/14 |
| | | | | 713/171 |
| 2016/0197901 | A1* | 7/2016 | Lester | H04L 9/0833 |
| | | | | 380/283 |
| 2017/0280377 | A1* | 9/2017 | Patil | H04W 12/0433 |
| 2019/0172298 | A1* | 6/2019 | Just | G07F 17/0042 |

FOREIGN PATENT DOCUMENTS

| | | | | |
|---|---|---|---|---|
| EP | 1536601 | B1 | 6/2005 | |
| EP | 1788770 | A1 | 5/2007 | |
| EP | 2680207 | A1 | 1/2014 | |
| EP | 2680487 | A1* | 1/2014 | ......... H04L 63/0428 |
| WO | 2012/067847 | A1 | 5/2012 | |
| WO | 2014/175830 | A1 | 10/2014 | |
| WO | 2016/195590 | A1 | 12/2016 | |

OTHER PUBLICATIONS

International Search Report for International Application No. PCT/FR2017/053867 dated Feb. 28, 2018, 3 pages.
Henry, Alan, The Best Cloud Storage Services that Protect Your Privacy, Lifehacker, https://lifehacker.com/th-bes-cloud-storage-services-that-protect-your-priva-729639300, (Jul. 10, 2013), 15 pages.
European Notification of Article 94(3) for Application No. 17832313.5 dated Nov. 10, 2021, 10 pages with translation.

* cited by examiner

METHOD FOR END-TO-END TRANSMISSION OF A PIECE OF ENCRYPTED DIGITAL INFORMATION, APPLICATION OF THIS METHOD AND OBJECT IMPLEMENTING THIS METHOD

CROSS-REFERENCE TO RELATED APPLICATIONS

This application is a national phase entry under 35 U.S.C. § 371 of International Patent Application PCT/FR2017/053867, filed Dec. 29, 2017, designating the United States of America and published as International Patent Publication WO 2018/130761 A1 on Jul. 19, 2018, which claims the benefit under Article 8 of the Patent Cooperation Treaty to French Patent Application Serial No. 1750212, filed Jan. 10, 2017.

TECHNICAL FIELD

This disclosure concerns the field of securing asynchronous electronic communication on computer networks, in particular, but not exclusively, the Internet or virtual private networks.

BACKGROUND

Information, such as digital data produced by connected objects, faxes, text messages, or digital files, is transmitted through a standardized set of data transfer protocols, which allows the development of various applications and services such as data publishing, e-mail, instant messaging, peer-to-peer, etc.

The most secure solutions use end-to-end encryption techniques. When a message is sent to a recipient, it is encrypted by the user, on the computer equipment of the sender, using solutions that ensure that only the receiver can decrypt the letter. The server through which the conversation passes is only used to relay without ever attempting to decode the conversation. In this case, users can communicate with each other without intermediaries.

Instead of being sent as a text, the message is scrambled as numbers and a key is required to decrypt it. The keys are ephemeral and disappear when the message has been decrypted by the user. As a result, hackers, cybercriminals and even the service operator's employees are not able to read the correspondence. For example, the WhatsApp (trade name) messaging service offers an end-to-end encryption solution.

The International Patent Application WO2014175830 describes a method for processing a data packet from a first computer device to a second computer device to enable end-to-end encryption communication.

The data packet includes an encrypted message using a first encryption key to form an encrypted message, identification data of the second encrypted computer device using a second encryption key to form encrypted identification data, and the first and second encryption keys.

The method according to this known solution is to decrypt the second encrypted encryption key, decrypt the encrypted identification data using the second decrypted encryption key, and transmit the data packet according to the decrypted identification data, the encrypted message and the first encryption key being so designed that they cannot be decrypted by the server to allow end-to-end encryption communication between the first and second computer devices.

International Patent Application WO2012067847 also describes systems and methods for end-to-end encryption. According to one embodiment, a device recording process consists of the following steps:

an application executed by a computer processor receives a user password from a user;
using the computer processor, the application combines the user password and a password extension;
using the computer processor, the application cryptographically processes the combination of the user password and the password extension, which allows public cryptographic information to be obtained. Public cryptographic information is provided to a server. However, the user word is not provided to the server.

European Patent EP1536601 discloses a method for the end-to-end encryption of e-mails sent from a sender to a recipient with the following steps:

a) the sender requests a certificate from an encryption system corresponding to the recipient,
b) the encryption system returns to the sender a first certificate corresponding to the recipient, the sender sends with its e-mail software an outgoing e-mail to the encrypted recipient with the certificate,
c) the email is sent by the encryption system.

The encryption system decrypts the email using a private key corresponding to the certificate, and the encryption system makes the content of the email available to the recipient.

The transmitter requests a certificate corresponding to the recipient from an encryption system in the private network, the encryption system returns to the transmitter a first pro forma certificate corresponding to the recipient, the pro forma certificate being generated or retrieved by the encryption system for the recipient and only used between the transmitter and the encryption system, the sender sends with his/her e-mail client an outgoing e-mail to the encrypted recipient with the pro forma certificate, the e-mail is transmitted via the encryption system, the encryption system decrypts the e-mail using a private key corresponding to the certificate, and the encryption system makes the content of the e-mail available to the recipient.

U.S. Pat. No. 7,240,366 describes an end-to-end authentication process based on public key certificates combined with the Session Initiation Protocol (SIP) to allow a SIP node that receives a SIP request message to authenticate the sender of the request. The SIP request message is sent with a digital signature generated with a private key of the sender and may include a certificate from the sender. The SIP request message can also be encrypted with a public key of the recipient. After receiving the SIP request, the SIP receiver node obtains a certificate from the sender and authenticates the sender based on the digital signature.

The digital signature can be included in a SIP request authorization header or in a multi-part message body built in accordance with the S/MIME standard.

U.S. Patent Application US20100189260 describes a solution for managing rights assigned to a communication session and to the components related to the user's request. The persons authorized to participate in the session are provided with access tools such as decryption keys. Restrictions based on the allocated conversation rights are extended to preserve the recordings and associated documents of the communication session.

The known solutions enable the end-to-end transmission of encrypted data or messages only between a sender previously registered on a transactional platform and a recipient, also previously registered on a transactional platform.

When a sender of data to a recipient wishes to send a message or one that is not already registered, they must first send them an unencrypted message inviting them to register on the transactional platform.

In the meantime, the sender must keep the message in the memory of their computer equipment, monitor the receipt of a registration notification from the recipient, and then initiate the process of the end-to-end transmission of the message or encrypted data with the newly registered recipient.

The invitation message sent by the sender can be intercepted, and then open a security breach.

In addition, if there is a long delay between the sending of the invitation and the notification of the sender's registration, the message or data may be lost or altered.

In any case, the prior art solutions require synchronization mechanisms between the computer equipment of the sender, that of the recipient and the transactional platform.

In particular, in the solution proposed by U.S. Patent Application US20100189260 (FIG. 3), users are already known to the platform, which does not allow communication with an unknown recipient of the platform.

The solutions of the prior art also present a security flaw known as the "man-in-the-middle attack," which is an attack aimed at intercepting communications between two parties, without either party being able to suspect that the communication channel between them has been compromised.

BRIEF SUMMARY

In order to remedy disadvantages of the previously known systems, the present disclosure provides a method for the end-to-end transmission of a piece of encrypted digital information between a transmitter registered on a transactional platform and at least one recipient of any kind, comprising the following steps:
  selection on the computer equipment of the transmitter of a piece of digital information and a digital identifier of the recipient;
  temporary encryption of the piece of digital information by execution of a local encryption application on the computer equipment with the private key of the sender;
  transmission by the computer equipment of the sender of the piece of encrypted digital information and the identifier of the recipient to the transactional platform;
  transmission by the platform to the recipient of a digital invitation message containing a link, the activation of which by the recipient requires:
    execution of a creation application on the computer equipment of the recipient with at least one pair of encryption keys, and
    transmission of at least one public key thus created by the equipment of the recipient to the transactional platform and the registration thereof on the platform in relation to the identifier of the recipient;
  notification by the transactional platform to the equipment of the sender of a digital message allowing recovery and recording the public key of the recipient in a temporary memory on the equipment of the sender;
  decryption of the piece of information on the equipment of the sender and encryption of the piece of information with the public key of the recipient;
  transmission to the recipient by the computer equipment of the sender of the piece of digital information encrypted with the public key of the sender, optionally via the transactional platform; and
  decryption by the computer equipment of the recipient of the piece of information with the public key of the sender.

According to an advantageous embodiment, at least one of the encryption applications consists of a WEB application transmitted by the computer platform to the computer equipment in the form of source code that can be executed by a browser [e.g., JavaScript].

According to another advantageous embodiment, at least one of the encryption applications consists of a mobile application previously installed on the host computer equipment.

According to another advantageous embodiment, at least one of the encryption applications consists of a downloadable mobile application for installation on the computer equipment of the recipient, the digital invitation message containing a mechanism controlling the downloading.

According to an alternative embodiment, the generation of the encryption keys includes a step of cryptographic processing applied to a combination formed by a password chosen by the user and a nonce transmitted by the transactional platform.

According to a particular embodiment, the method is applied to a group formed by a plurality of recipients, the method comprising:
  a step of introducing unique intermediate encryption keys for each piece of digital information,
  each recipient accessing the piece of digital information, by decrypting the intermediate keys using their personal keys,
  steps for recalculating intermediate keys in the event of a change in the group of recipients.

According to another particular embodiment, the method is applied to a group of digital information, the method comprising:
  a step of introducing unique intermediate encryption keys for each piece of digital information,
  each recipient accessing the whole of the group of digital information, by decrypting the intermediate keys with their personal keys.

According to a particular embodiment, at least one piece of the computer equipment consists of a connected object.

Advantageously, the generation of encryption keys comprises a step of cryptographic processing applied to a combination formed by a secret unique piece of information recorded in the connected object at the time of its manufacture and a nonce transmitted by the transactional platform.

The disclosure also concerns the application of the above-mentioned method for end-to-end transmission of a piece of encrypted digital information for a messaging service.

It also concerns the method for end-to-end transmission of a piece of encrypted digital information for a file-sharing service.

It also concerns the application of the method for end-to-end transmission of a piece of encrypted digital information for a real-time multimedia communication service [e.g., voice, chat, etc.].

It also concerns the application of the above-mentioned method for end-to-end transmission of a piece of encrypted digital information a for a digital information communication service with a connected object.

It also concerns the application of the above-mentioned method for end-to-end transmission of a piece of encrypted digital information for a digital information communication service with a connected piece of medical equipment.

The disclosure still concerns a connected object comprising a unique and secret information recorded at the time of its manufacture, a processor for executing applications recorded in a local memory, and means for communicating with a remote platform, characterized in that one of the recorded applications is capable of executing the local processing specific to the method as described herein.

Preferably, the connected object according to the disclosure comprises a computer associated with a network communication circuit and a non-volatile memory area, wherein at least one digital sequence corresponding to the password is recorded.

BRIEF DESCRIPTION OF THE DRAWINGS

This disclosure will be best understood when reading the following detailed description thereof, which relates to a non-restrictive exemplary embodiment, while referring to the appended drawings, wherein.

DETAILED DESCRIPTION

Figure 1:
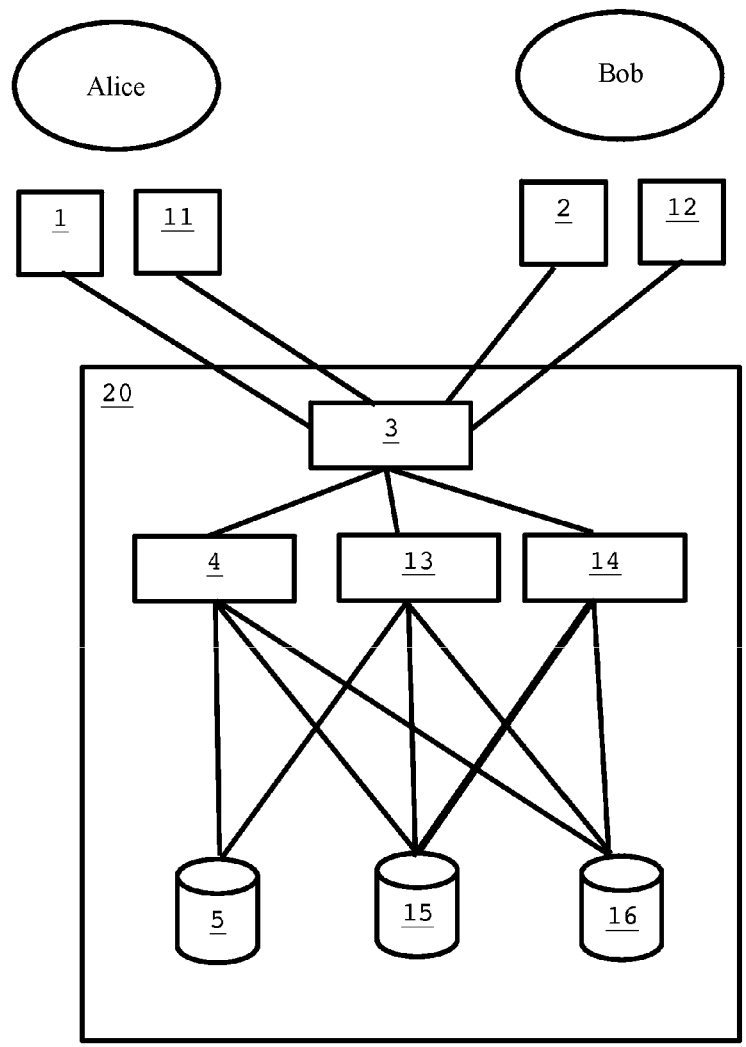
FIG. 1 shows a schematic view of the hardware architecture of a system for implementing the disclosure.
Figure 2:
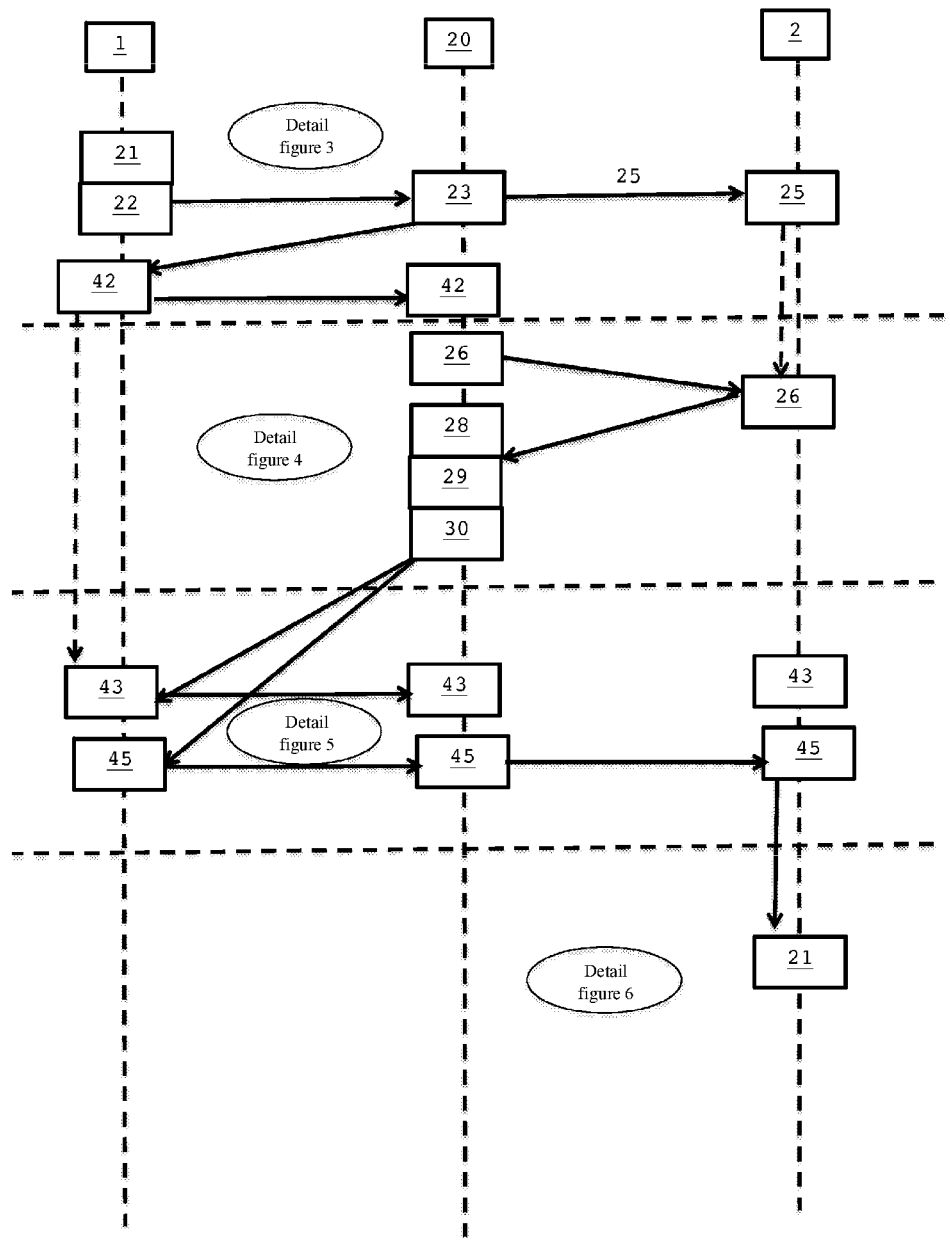
FIG. 2 shows the diagram of data exchange between Alice and Bob.

FIG. 1 represents a schematic view of the hardware architecture, in a simplified situation concerning exchanges between two users only.

Users referred to herein as "Alice" and "Bob" each use one or more piece(s) of connected computer equipment respectively 1, 11; 2, 12. For example, it may be a connected computer or tablet, or a "Smartphone" type phone.

In the case of a computer, the computer must have computer resources to access a network, for example, the Internet, and a standard WEB browser.

In the case of a tablet or a phone, the equipment also includes resources such as a browser or a mobile application providing the connection to a remote platform.

The system, according to the disclosure, optionally implements a proxy 3, which distributes the service load to one or more server(s) 4, 13, 14 that can be local or remote in the "cloud," and executes an interactive application program interface (API).

The servers 4, 13, 14 are associated with one or more pieces of database management equipment 5, 15, 16, which can be local or remote in the "cloud."

The communication between the different devices uses a standard transport layer, for example, TCP/IP or Lora, and a standard communication layer, for example, http or https.

The proxy 3 and the servers 4, 13, 14 as well as database management equipment 5, 15, 16 form a secure exchange platform 20.

Diagram of Exchanges

The initiator of the exchanges is Alice, wishing to send Bob a message in a secure form via a platform, it being understood that Bob does not have access to the exchange platform 20.

Alice locally composes, on one piece of her computer equipment 1, 11, a digital message 21 with any editor, for example, a messaging application adapted to the platform 20, and therefore an API client server 4, 13, 14 and locally stores in the buffer memory of one of her devices 1, 11.

Alice then enters a public identifier 22 of the recipient Bob, such as Bob's email address or mobile phone number into the application executed on her computer equipment 1, 11.

This application then commands the opening of a communication session with this identifier. The application then commands a request to be sent via the platform 20 for the transport layer and via this session and, for the communication layer, via Bob's identification session token (or the equivalent mechanism), as a message containing at least Bob's identifier 22.

The platform 20 compares the identifier 22 transmitted by Alice with the list of account holder identifiers during a verification step 23.

If Bob is unknown, i.e., does not have an account on the platform 20, the platform generates a temporary account associated with Bob's identifier 22 transmitted by Alice.

This temporary account results in:
- the creation of an entry dedicated to Bob in the database management equipment 5, 15, 16;
- the platform 20 sending a message to Bob, containing:
  - a text message 25 informing Bob of the existence of a message from Alice; and
  - a link to a creation interface 26 for Bob to create a password, for example, as a JavaScript and HTML code.

This creation interface 26 is executed immediately or off-line on Bob's computer equipment 2, locally and with no communication of the password 27 created by Bob to the platform 20 nor to Alice's computer equipment 1, 11 and more generally to any equipment present on the network.

The platform 20 then transmits an acknowledgement message to Alice. Sending this message means that:
- the platform 20 has created a temporary account assigned to Bob;
- the platform 20 transmitted to Bob the message 25 containing the link enabling him, when he decides to, to start the step of entering a password into the creation interface 26.

Temporary Recording of Alice's Message

Figure 3:
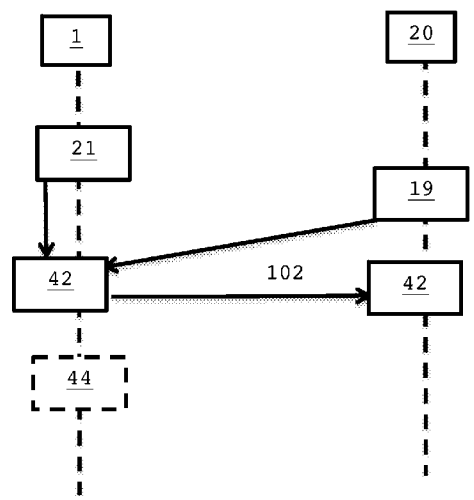
FIG. 3 shows the block diagram of the step of temporary recording of Alice's message.

FIG. 3 shows the block diagram of the step of temporary recording Alice's message.

Receiving the message automatically triggers the following operations:
- Alice's client application controls the encryption of the message 21 with Alice's public key 19, transmitted by the platform 20 from the piece of information stored in the database 5, 15, 16 and corresponding to her account. This public key is, for example, transmitted in the message or in the login process. It can also be stored locally on Alice's computer equipment 1, 11, for example, in the cache memory of a mobile application. This step results in an encrypted message 42 containing generally unencrypted metadata, including an ID of the recipient Bob.
- this encrypted message 42 is then transmitted by a transmission to the platform 20 and recorded, for example:
- in the database management equipment 5, 15, 16 of the platform 20;
- in a third-party mailbox linked to Alice; or
- in a Cloud platform, etc.

The platform also records metadata 43 in the database management equipment 5, 15, 16 of the platform 20 containing, in particular, the storage address of the message, for example, as a URL address.

Optionally, Alice's computer equipment 1, 11 generates a random encryption key 44 enabling the symmetric encryption of the encrypted message 42. This random key 44 is itself asymmetrically encrypted with Alice's public key 19 so that Alice can then decrypt the random key 44 with her own private key.

Generation of Bob's Public and Private Information

This step is asynchronous relative to the exchange process. It occurs at any time after receipt of notification of the message 25 and the associated link.

Figure 4:
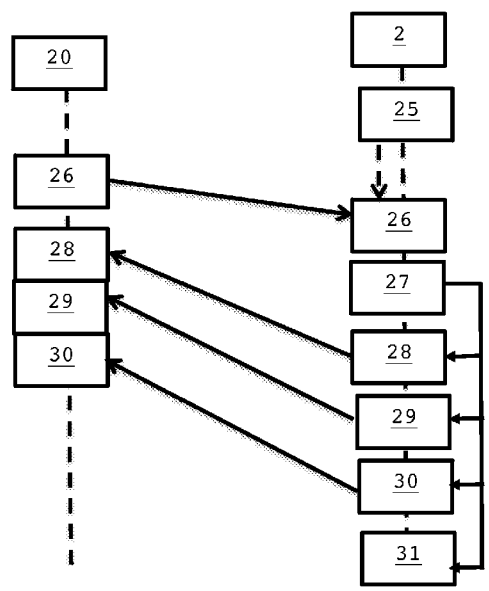
FIG. 4 shows the diagram of generation of information from the password chosen by Bob.

FIG. 4 shows the details of the procedure for creating Bob's public and private information.

The password 27 can be entered by Bob on a physical or virtual keyboard. It can also be generated by a code generator type equipment.

This password 27 is processed by the creation interface 26 to generate:
- a condensate (hash) 28 by application of a known cryptographic algorithm;
- optionally one or more random number(s) 29; and
- a pair of public 30 and private 31 keys.

From the code executed from the creation interface 26, Bob creates a character string that constitutes a password 27.

The creation interface 26 generates a random number 29 in the example described.

The creation interface 26 controls the calculation of three digital sequences:
- an optional condensate 28, by applying a Sha512 type processing, for example, to the character sequence password 27, after possible application of a salt algorithm to this password 27; and
- a pair of private/public keys respectively 30, 31 by applying processing, for example, PBKDF2, to a combination of the random number 29 and the password 27.

The result of these operations leads to:
- secret data, which Bob does not pass on to third parties: this is the password 27 and the private key 31;
- public data, which is transmitted to the platform 20 and recorded on Bob's account: the condensate 28, the random number 29 and the public key 30.

New Encryption of the Message by Alice

When Alice transmits the encrypted message 42 to the platform 20 as mentioned in FIG. 3, and Bob asynchronously enters a password as mentioned in FIG. 4, the conditions for finalizing the exchange between Alice, who already has an account, and Bob, who did not have an account at the time the message 21 was sent, are met.

Figure 5:
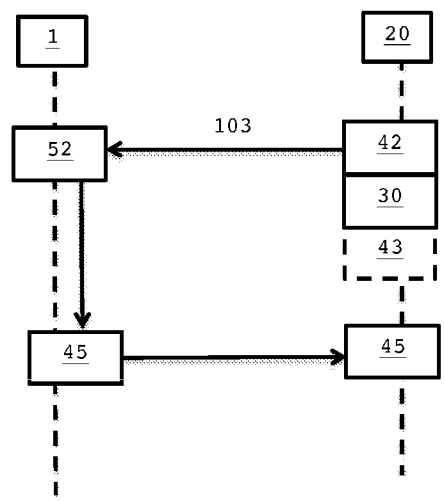
FIG. 5 shows the block diagram of the step of new encryption of the message by Alice.

FIG. 5 shows the block diagram of the step of the new message encryption by Alice.

In an automatic execution mode, when one piece of Alice's computer equipment 1, 11 is connected to the platform 20, the platform 20 commands a step of new encryption 52 of the message 42 on one piece of Alice's computer equipment 1, 11, and not on the platform 20.

If necessary, for example, when the computer equipment 1, 11 does not have a cache, this operation provides for the transmission 103 by the platform 20 to Alice's computer equipment 1, 11 of:
- Bob's public key 30;
- the metadata 43 associated with the encrypted message 42;
- optionally the encrypted message 42 on Alice's connected equipment 1, 11.

First Alternative Solution

As a first alternative solution, the platform 20 transmits the entire encrypted message 42 to Alice, and Alice decrypts this message with her private key, then encrypts it again with Bob's public key 30 that the platform 20 has just transmitted to her.

The original message 21, initially encrypted with Alice's public key 19 to obtain a transient encrypted message 42, is now available in a new form 45 encrypted with Bob's public key.

The message 42 is deleted from the platform 20 and replaced by the encrypted message 45.

This alternative solution requires heavy processing for important messages.

Second Alternative Solution

According to another alternative solution, the platform 20 transmits the random key 44 to Alice only. Alice deciphers this random key 44 with her private key, then encrypts the random key 44 thus decrypted with Bob's public key 30, that the platform 20 has just sent her, again.

In this case, the encrypted message 42 is kept, only the associated metadata 43 are updated on the platform thanks to an automatic request from Alice.

This alternative solution simplifies the processing of large-volume messages.

Retrieval of the Message by Bob

Figure 6:
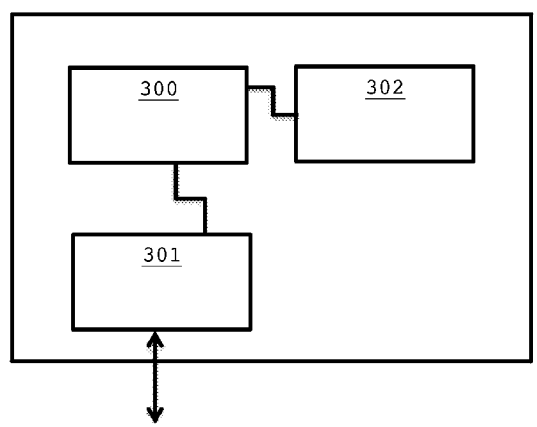
FIG. 6 shows the block diagram of the step of retrieval of the message by Bob.

FIG. 6 shows the block diagram of the step of message retrieval by Bob.

After this re-encryption operation, the platform 20 sends Bob a digital message including a text or automatic notification enabling him to retrieve Alice's encrypted message.

Alternatively, Bob's application periodically queries the platform 20 to check the availability of new messages, or Bob manually connects to the platform 20 to check if new messages are available.

Upon connection, Bob's computer equipment 2, 12 performs similar processing as shown in FIG. 5, based on the password 27 he had initially created, and the random number 29 initially recorded on the platform 20.

This enables Bob to regenerate the public key 30 and the private key 31 that is never stored and never passes through the network.

Bob can then retrieve the encrypted metadata 43 and the encrypted message (42 or 45, depending on the variant), and decrypt them with his private key 31.

For subsequent exchanges, both parties have an account on the platform 20 enabling them to communicate in encrypted mode from end to end.

Functional Architecture of a Connected Object

In the case where the exchanges are not between two people with computer equipment, but between connected objects or a connected object and a person, the connected object has an architecture, an example of which is shown in FIG. 6.

The connected object comprises a computer 300 associated with a network communication circuit 301 in a known way.

The computer 300 has a non-volatile memory 302 area in which at least one digital sequence corresponding to the password 27 is stored. Optionally, the non-volatile memory 302 may also contain a second digital sequence corresponding to the random number 29.

The invention claimed is:

1. A method for end-to-end transmission of a piece of encrypted digital information between a transmitter registered on a transactional platform and at least one recipient of any kind, comprising:

selection on computer equipment of the transmitter of a piece of digital information and a digital identifier of the at least one recipient;

temporary encryption of the piece of digital information by execution of a local encryption application on the computer equipment of the transmitter with a private key of the transmitter;

transmission by the computer equipment of the transmitter of the piece of encrypted digital information and the digital identifier of the at least one recipient to the transactional platform;

transmission by the transactional platform to computer equipment of the at least one recipient of a digital invitation message containing a link, activation of which by the at least one recipient requires:
- the execution of a creation application on the computer equipment of the at least one recipient of at least one pair of encryption keys, and
- the transmission of at least one public key thus created by the computer equipment of the at least one recipient to the transactional platform and its registration on the transactional platform in relation to the digital identifier of the at least one recipient;

notification by the transactional platform to the computer equipment of the transmitter of a digital message enabling the recovery and recording in a temporary memory on the computer equipment of the transmitter of the at least one public key of the at least one recipient;

decryption of the piece of digital information on the computer equipment of the transmitter and encryption of the piece of digital information with the at least one public key of the at least one recipient;

transmission to the at least one recipient by the computer equipment of the transmitter of the piece of digital information encrypted with the at least one public key of the at least one recipient, optionally via the transactional platform; and decryption by the computer equipment of the at least one recipient of the piece of digital information with the private key of the at least one recipient.

2. The method of claim 1, wherein the local encryption application comprises a browser-executable application transmitted by a computer platform to the computer equipment of the transmitter in the form of a source code executable by a browser.

3. The method of claim 1, wherein the local encryption application comprises a mobile application previously installed on the computer equipment of the transmitter.

4. The method of claim 1, wherein the creation application comprises a downloadable mobile application for installation on the computer equipment of the at least one recipient, and wherein the digital invitation message contains a mechanism controlling downloading of the downloadable mobile application.

5. The method of claim 1, wherein generation of the at least one pair of encryption keys includes a step of cryptographic processing applied to a combination formed by a password chosen by a user and a nonce transmitted by the transactional platform.

6. The method of claim 1, applied to a group including a plurality of recipients, the method comprising:
a step of introducing unique intermediate encryption keys for each piece of digital information,
each recipient of the plurality of recipients accessing the piece of digital information, by decrypting the unique intermediate encryption keys using each recipient's respective personal keys, and
steps for recalculating the unique intermediate encryption keys in the event of a change in the group including the plurality of recipients.

7. The method of claim 1, applied to a group of digital information, the method comprising:
a step of introducing unique intermediate encryption keys for each piece of digital information, and
each recipient accessing the whole of the group of digital information, by decrypting the unique intermediate encryption keys with each recipient's respective personal keys.

8. The method of claim 1, wherein at least one of the computer equipment of the transmitter and the computer equipment of the recipient comprises a connected object.

9. The method of claim 6, wherein generation of the at least one pair of encryption keys comprises a step of cryptographic processing applied to a combination formed by a secret unique piece of information recorded in a connected object at the time of its manufacture and a nonce transmitted by the transactional platform.

10. The method of claim 1, wherein the piece of digital information comprises a communication message.

11. The method of claim 1, wherein the piece of digital information comprises a data file.

12. The method of claim 1, wherein the piece of digital information comprises a multimedia communication file.

13. The method of claim 1, wherein at least one of the transmitter and the at least one recipient comprises a connected object.

14. The method of claim 1, wherein at least one of the transmitter and the at least one recipient comprises connected medical equipment.

15. A connected object, comprising:
non-volatile memory storing a unique and secret piece of information recorded at the time of manufacture of the connected object;
a processor for executing applications recorded in the non-volatile memory; and
a communication circuit for communicating with a remote platform, characterized in that one of the recorded applications is capable of executing the local processing specific to the method according to claim 1.

16. The connected object of claim 15, wherein the connected object comprises a computer and the communication circuit comprises a network communication circuit, and wherein at least one digital sequence corresponding to a password is recorded in the non-volatile memory.

17. The method of claim 1, further comprising transmission by the transactional platform of the piece of encrypted digital information to the computer equipment of the transmitter.

18. The method of claim 1, further comprising following transmission by the computer equipment of the transmitter of the piece of encrypted digital information and the digital identifier of the at least one recipient to the transactional platform, not retaining, at the computer equipment of the transmitter, the piece of encrypted digital information.

* * * * *